United States Patent
Tsuda et al.

(10) Patent No.: US 9,897,992 B2
(45) Date of Patent: Feb. 20, 2018

(54) NUMERICAL CONTROL APPARATUS

(75) Inventors: Takeshi Tsuda, Tokyo (JP); Keiichiro Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 338 days.

(21) Appl. No.: 14/400,879

(22) PCT Filed: May 22, 2012

(86) PCT No.: PCT/JP2012/063061
§ 371 (c)(1),
(2), (4) Date: Nov. 13, 2014

(87) PCT Pub. No.: WO2013/175573
PCT Pub. Date: Nov. 28, 2013

(65) Prior Publication Data
US 2015/0134103 A1 May 14, 2015

(51) Int. Cl.
*G05B 19/19* (2006.01)
*G05B 19/4103* (2006.01)

(52) U.S. Cl.
CPC ......... *G05B 19/19* (2013.01); *G05B 19/4103* (2013.01); *G05B 2219/37618* (2013.01); *G05B 2219/41188* (2013.01)

(58) Field of Classification Search
CPC ............... G05B 19/19; G05B 19/4103; G05B 2219/37618; G05B 2219/41188
See application file for complete search history.

(56) References Cited

U.S. PATENT DOCUMENTS 6,775,586 B2   8/2004  Shibata et al.
2008/0249653 A1 * 10/2008 Ichikawa ............ G05B 19/4155
                                                 700/189
(Continued)

FOREIGN PATENT DOCUMENTS

JP    09-254062 A    9/1997
JP    2003-195917 A  7/2003
(Continued)

OTHER PUBLICATIONS

Office Action of JP Application No. 2013-520656 dated Jul. 26, 2013.
(Continued)

*Primary Examiner* — Miranda Huang
*Assistant Examiner* — John Park
(74) *Attorney, Agent, or Firm* — Sughrue Mion, PLLC; Richard C. Turner

(57) ABSTRACT

A numerical control apparatus that controls a machine tool including a plurality of linear axes and rotation axes, and controls a relative tool posture with respect to work on a table includes a program reading unit that sequentially reads a tool posture with respect to the work from a machining program, a determining unit that determines whether the read tool posture is within a predetermined tool posture range, a tool-posture control unit that determines control content of the tool posture according to the determination by the determining unit, and an interpolation/acceleration and deceleration processing unit that controls the linear and rotation axes according to the control content of the tool posture. When the read tool posture is within the predetermined range, the tool-posture control unit determines rotation axis angles of the rotation axes such that a change of tool posture from the last tool posture is limited.

7 Claims, 5 Drawing Sheets

(56) References Cited

U.S. PATENT DOCUMENTS

| | | | |
|---|---|---|---|
| 2009/0228138 A1 | 9/2009 | Otsuki et al. | |
| 2011/0166693 A1* | 7/2011 | Nishibashi | G05B 19/4103 |
| | | | 700/187 |
| 2015/0068272 A1* | 3/2015 | Kasahara | G05B 19/4061 |
| | | | 73/1.79 |

FOREIGN PATENT DOCUMENTS

| | | |
|---|---|---|
| JP | 2007-004548 A | 1/2007 |
| JP | 2009-166164 A | 7/2009 |
| JP | 4406034 B2 | 1/2010 |
| JP | 2010-140312 A | 6/2010 |
| WO | 2011/064816 A1 | 6/2011 |

OTHER PUBLICATIONS

International Search Report of PCT/JP2012/063061 dated Jul. 31, 2012 [PCT/ISA/210].
Communication dated Dec. 4, 2014 from The Taiwanese Patent Office in counterpart Taiwanese Patent Application No. 101143211.
Communication dated Jul. 14, 2015 from the German Patent Office issued in corresponding application No. 112012006403.8.

\* cited by examiner

| SEQUENCE NUMBER | B-AXIS ANGLE [DEGREE] | C-AXIS ANGLE [DEGREE] |
|---|---|---|
| N21 | 45 | 0 |
| N22 | 0.20 | 0 |
| N23 | 0.40 | 60 |
| N24 | 0.00 | 30 |
| N25 | 0.20 | 10 |
| N26 | 0.12 | 80 |
| N27 | 30 | 45 |

(b)

| SEQUENCE NUMBER | B-AXIS ANGLE [DEGREE] | C-AXIS ANGLE [DEGREE] |
|---|---|---|
| N21 | 45 | 0 |
| N22 | 0.20 | 0 |
| N23 | 0.40 | 60→20 |
| N24 | 0.00 | 30→40 |
| N25 | 0.20 | 10→60 |
| N26 | 0.12 | 80 |
| N27 | 30 | 45 |

(c)

| SEQUENCE NUMBER | B-AXIS ANGLE [DEGREE] | C-AXIS ANGLE [DEGREE] |
|---|---|---|
| N21 | 45 | 0 |
| N22 | 0.20 | 0 |
| N23 | 0.40→0.18 | 60→20 |
| N24 | 0.00→0.16 | 30→40 |
| N25 | 0.12→0.14 | 10→60 |
| N26 | 0.12 | 80 |
| N27 | 30 | 45 |

NUMERICAL CONTROL APPARATUS

CROSS REFERENCE TO RELATED APPLICATIONS

This application is a National Stage of International Application No. PCT/JP2012/063061, filed May 22, 2012, the contents of which are incorporated herein by reference in its entirety.

FIELD

The present invention relates to a numerical control apparatus.

BACKGROUND

A machine tool mounted with a numerical control apparatus performs machining while controlling axes to move a movable section to a position commanded by a machining program. However, a machine including a linear movement axis and a rotational movement axis like a five-axis machine realizes more complicated machining by appropriately controlling the respective axes to set a tool position and a tool posture in a desired position and a desired posture.

Patent Literature 1 suggests that, in a numerical control apparatus that controls a five-axis machine that linearly drives a table in X-axis and Y-axis directions and rotates the table in a C-axis direction and linearly drives a tool in a Z-axis direction and rotates the tool in an A-axis direction, after interpolation is performed from a start position to a commanded position concerning the X axis, the Y axis, and the Z axis on the basis of a position and speed on a work coordinate system commanded by the NC program, interpolation is performed from the start position to the commanded position concerning the A axis and the C axis and interpolation positions of the X axis, the Y axis, and the Z axis (linear axes) are corrected on the basis of interpolation positions of the A axis and the C axis (rotational axes). Consequently, according to Patent Literature 1, it is possible to apply accurate machining to work placed on the rotating table while performing interpolation according to a simple NC program.

CITATION LIST

Patent Literature

Patent Literature 1: Japanese Patent Application Laid-Open No. 2003-195917

SUMMARY

Technical Problem

The tool tip point control described in Patent Literature 1 is considered to be control for controlling a track of a tool tip point with respect to work while changing a tool posture by interpolating the tool posture while interpolating axis movements such that a track and speed on the work commanded by a machining program and a track and speed on the work of an edge position of a tool (the tool tip point) coincide with each other. That is, the technology described in Patent Literature 1 is based on the premise that the tool posture can always be accurately changed.

On the other hand, the inventor performed an examination and found that there is a case in which a machining program that causes fluctuation in a tool posture is created.

For example, a machining program used in a machine tool such as a five-axis machine is often a complicated program because the machining program commands not only a tool position but also a tool posture. Therefore, although a machining program is usually created by a CAM (Computer Aided Manufacturing) apparatus or the like, the CAM outputs the machining program including a quantization error of a tolerance width degree set by the CAM with respect to an ideal tool position and an ideal tool posture. Therefore, a machine program that causes fluctuation in a tool position and a tool posture is sometimes created.

The inventor performed an examination concerning this point and found that the fluctuation in the tool posture does not pose a serious problem when the tool posture is away from a peculiar posture, but when the tool posture is near the peculiar posture, small posture fluctuation sometimes changes to a large movement amount of a rotation axis. The peculiar posture indicates a posture in which a rotation axis of a tool in a machine tool is 0 degree (a center axis of the tool is parallel to a Z axis perpendicular to a principal plane of a table). In this case, an angle of a rotation axis of the table is not uniquely determined, and any angle can be selected.

In the tool tip point control described in Patent Literature 1, when the tool posture is near the peculiar posture, a very small tool posture change caused by a problem due to a quantization error in the CAM easily changes to a large movement amount of the rotation axis, and a moving time of the rotation axis tends to increase.

In the tool tip point control described in Patent Literature 1, the interpolation position of the linear axis is corrected on the basis of the interpolation position of the rotation axis. Therefore, when the tool posture is near the peculiar posture, according to an increase in the movement amount of the rotation axis, a movement amount of the linear axis also increases. Therefore, the influences of a backlash, a lost motion, and friction notably occur, and accordingly it is likely that machining accuracy is deteriorated.

The present invention has been devised in view of the above and it is an object of the present invention to obtain a numerical control apparatus that can reduce time of rotational movement of a rotation axis and improve machining accuracy.

Solution to Problem

To solve the above problem and achieve the object, a numerical control apparatus that controls a machine tool including a plurality of linear axes and one or more rotation axes and controls a relative tool posture with respect to work placed on a table, the numerical control apparatus includes: a program reading unit that sequentially reads a tool posture with respect to the work from a machining program; a determining unit that determines whether or not the read tool posture is within a predetermined tool posture range; a tool-posture control unit that determines control content of the tool posture according to a result of the determination by the determining unit; and an interpolation/acceleration and deceleration processing unit that controls the plurality of linear axes and the one or more rotation axes according to the determined control content of the tool posture. The predetermined tool posture range includes a peculiar posture in which a principal plane of the table and a center axis of a tool cross substantially perpendicularly to each other, and when the read tool posture is within the predetermined tool posture range, the tool-posture control unit determines rotation axis angles of the one or more rotation axes such that a change of the tool posture from a last tool posture is limited.

Advantageous Effects of Invention

According to the present invention, when a tool posture commanded by a machining program is near a peculiar posture, it is possible to suppress a rotational movement amount of the rotation axis and reduce the time for a rotational movement of the rotation axis. When the tool posture is near the peculiar posture even if control for correcting an interpolation position of the linear axis is performed on the basis of an interpolation position of the rotation axis, it is possible to suppress the rotational movement amount of the rotation axis. Therefore, it is also possible to suppress a movement amount of the linear axis, reduce the influences of a backlash, a lost motion, and friction, and improve machining accuracy. That is, it is possible to reduce the time for the rotational movement of the rotation axis and improve machining accuracy.

BRIEF DESCRIPTION OF DRAWINGS

FIGS. 5(a), 5(b) and 5(c) are diagrams for explaining the operation of the numerical control apparatus according to the second embodiment.

Embodiments of a numerical control apparatus according to the present invention are explained in detail below with reference to the drawings. Note that the present invention is not limited by the embodiments.

First Embodiment

A numerical control apparatus 2 according to a first embodiment is explained.

The numerical control apparatus 2 is an apparatus that subjects a machine tool 100 to numerical control (NC) and is, for example, an apparatus that controls a tip position of a tool 102 and a posture of the tool 102.

Figure 1:
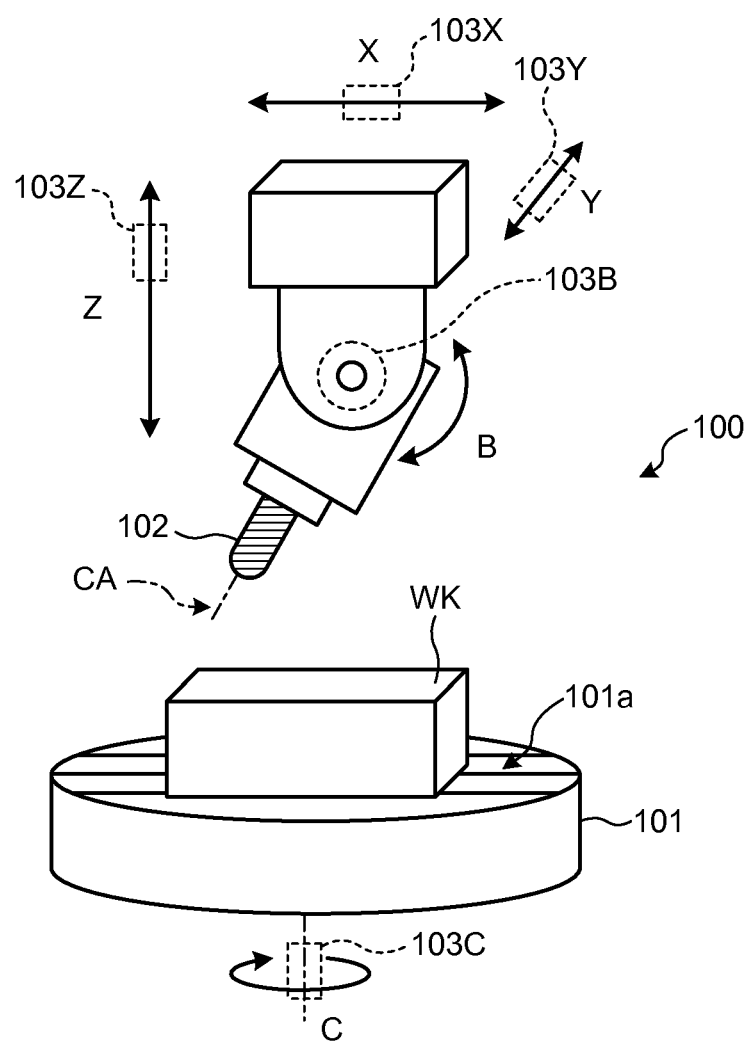
FIG. 1 is a diagram of the configuration of a machine tool in a first embodiment.

The machine tool 100 mounted with the numerical control apparatus 2 performs machining while controlling axes to move a movable section to a position commanded by a machining program (an NC program or a motion program). The machine tool 100 includes a plurality of linear axes and one or more rotation axes. Specifically, for example, as shown in FIG. 1, the machine tool 100 is a five-axis machine including an X axis, a Y axis, and a Z axis, which are three linear axes (translational axes) and a B axis and a C axis, which are two rotation axes. The X axis is an axis for an X-axis servomotor 103X to linearly move the tool 102. The Y axis is an axis for a Y-axis servomotor 103Y to linearly move the tool 102. The Z axis is an axis for a Z-axis servomotor 103Z to linearly move the tool 102. The X axis, the Y axis, and the Z axis are, for example, orthogonal to one another. The B axis (a first rotation axis) is an axis for a B-axis servomotor 103B to rotationally move the tool 102.

The B-axis servomotor 103B rotationally moves the tool 102, for example, about the Y axis. The C axis (a second rotation axis) is an axis for a C-axis servomotor 103C to rotationally move a table 101. The C-axis servomotor 103C rotationally moves the table 101, for example, about the Z axis. Work WK is placed on a principal plane 101a of the table 101.

Note that FIG. 1 illustratively shows the configuration of the machine tool 100 in which the rotation axes (the B axis and the C axis) are provided one each on a tool side and a work side. However, the machine tool 100 can be a five-axis machine in which two rotation axes (the B axis and the C axis) are provided on the work side or can be a five-axis machine in which the rotation axes (the B axis and the C axis) are provided on the tool side.

A machining program 1 (see FIG. 2) is a program described using a command code called G code and is a program described using, as movement commands, a tool tip point control (G43.4/G43.5) command or the like as a simultaneous five-axis control function besides a positioning command (G00) and a cutting command (G01).

The numerical control apparatus 2 analyzes the machining program 1, controls the machine tool 100 (e.g. a five-axis machine) via a servo amplifier 3 according to an analysis result (see FIG. 1), and performs machining of the work WK while controlling a relative tool posture with respect to the work WK placed on the table 101. For example, the numerical control apparatus 2 realizes complicated machining for the work WK by respectively appropriately controlling each of the X, Y, Z, B, and C axes to set the position and the posture of the tool 102 in a desired tool position and a desired tool posture. For example, the numerical control apparatus 2 outputs a predetermined movement command 230 to each of an X-axis amplifier 3X, a Y-axis amplifier 3Y, a Z-axis amplifier 3Z, a B-axis amplifier 3B, and a C-axis amplifier 3C in the servo amplifier (see FIG. 2). Consequently, the X-axis amplifier 3X, the Y-axis amplifier 3Y, the Z-axis amplifier 3Z, the B-axis amplifier 3B, and the C-axis amplifier 3C respectively output voltage commands to the X-axis servomotor 103X, the Y-axis servomotor 103Y, the Z-axis servomotor 103Z, the B-axis servomotor 103B, and the C-axis servomotor 103C and drive the servomotors.

The inventor performed an examination concerning the machining program and found that a machining program that causes fluctuation in a tool posture is sometimes created.

For example, a machining program used in a machine tool such as a five-axis machine is often a complicated program because the machining program commands not only a tool position but also a tool posture. Therefore, although a machining program is usually created by a CAM (Computer Aided Manufacturing) apparatus or the like, the CAM outputs the machining program including a quantization error of a tolerance width degree set by the CAM with respect to an ideal tool position and an ideal tool posture. Therefore, a machine program that causes fluctuation in a tool position and a tool posture is sometimes created.

The inventor further performed an examination concerning this point and found that the fluctuation in the tool posture does not pose a serious problem when the tool posture is away from a peculiar posture, but when the tool posture is near the peculiar posture, small posture fluctuation sometimes changes to a large movement amount of a rotation axis. The peculiar posture indicates a posture in which the B axis, which is a rotation axis of the tool 102 in the machine tool 100, is 0 degree (a center axis CA of the tool is parallel to the Z axis perpendicular to a principal plane of the table 101). In this case, an angle of the C axis, which is a rotation axis of the table 101, is not uniquely determined. Any angle can be selected.

Specifically, regarding the case where the tool posture is away from the peculiar posture, an example in which fluctuation is present in the tool posture at a B-axis angle other than 0 degree is provided. In this case, a machining program created by the CAM is, for example, as shown below.

| N1 | G43.5 | X0. | Y0. | I0.7071 | J0.0000 | K0.7071; |
|---|---|---|---|---|---|---|
| N2 |  | X10. | Y0. | I0.173648 | J0.000303 | K0.984808; |
| N3 |  | X0.1 | Y0. | I0.173820 | J0.000000 | K0.984777; |
| ... |  |  |  |  |  |  |
| N10 | G49; |  |  |  |  |  |

This machining program is a machining program which enables tip point control at "G43.5" of a sequence number "N1" and disables the tip point control at "G49" of a sequence number "N10", wherein a tool track is commanded by X and Y with respect to a coordinate system (a table coordinate system) associated with the rotation of the table 101, and a tool posture is commanded using direction vector I, J, and K viewed from the table coordinate system. Note that, in the machining program, tool postures of an "N2" block and an "N3" block are tool postures having very small angle differences of about 0.028 degree.

At an "N1" block end point, two kinds of solutions are present in which a B-axis angle is 45 degrees and a C-axis angle is 0 degrees, and the B-axis angle is −45 degrees and the C-axis angle is 180 degrees. If the former solution is selected, the B-axis angle is set to 45 degrees and the C-axis angle is set to 0 degree. That is, the B-axis angle is a value greatly different from 0 degree and the tool posture is away from the peculiar posture.

Further, when a solution for reducing a movement amount of the rotation axis is selected in the "N2" block and the "N3" block, at an "N2" block end point, the B-axis angle is 10 degrees, the C-axis angle is 0.1 degree, and at an "N3" block end point, the B-axis angle is 10.02 degrees and the C-axis angle is 0 degree. In this case, regarding the movement amounts in the "N3" block, a B-axis movement amount is 0.02 degree and a C-axis movement amount is −0.1 degree, so that the movement amounts are small in both of the B axis and the C axis. Further, in the other solutions in the "N2" block and the "N3" block, the B-axis angle is −10 degrees and the C-axis angle is 180.1 degrees and the B-axis angle is −10.02 degrees and the C-axis angle is 180 degrees. In this case as well, regarding the movement amounts in the "N3" block, a B-axis movement amount is −0.02 degree and a C-axis movement amount is −0.1 degree, so that the movement amounts are small in both of the B axis and the C axis.

On the other hand, regarding the case where the tool posture is near the peculiar posture, an example in which fluctuation is present in the tool posture at a B-axis angle near 0 degree is now provided. In this case, a machining program created by the CAM is, for example, as shown below.

| N11 | G43.5 | X0. | Y0. | I0.7071 | J0.0000 | K0.7071; |
|---|---|---|---|---|---|---|
| N12 |  | X10. | Y0. | I0.000349 | J0.000000 | K1.000000; |
| N13 |  | X0.1 | Y0. | I0.000000 | J0.000349 | K1.000000; |
| ... |  |  |  |  |  |  |
| N20 | G49; |  |  |  |  |  |

In this machining program, very small fluctuation in a tool posture is present in an "N12" block and an "N13" block. An angle difference between the blocks is 0.020 degree. It is assumed that, at an "N12" block end point, the B-axis angle is set to 0.02 degree and the C-axis angle is set to 0 degree.

In this case, at an "N13" block end point, any one of solutions is selected in which the B-axis angle is 0.02 degree and the C-axis angle is 90 degrees and the B-axis angle is −0.02 degree and the C-axis angle is 270 degrees. When the former solution is selected, regarding the movement amounts in the "N13" block, a B-axis movement amount is 0 degree and a C-axis movement amount is 90 degrees, and even when the latter solution with small rotation axis movement amounts is selected, the B-axis movement amount is 0.04 degree and the C-axis movement amount is −90 degrees. In both the cases, the C axis largely rotated.

In this way, when the control of the tool posture is simply performed according to the tool posture commanded by the machining program, when the tool posture is near the peculiar posture, a very small tool posture change caused by a problem due to a quantization error in the CAM easily changes to a large rotational movement amount of the C axis, and the time for rotational movement of the C axis tends to increase.

If control for correcting interpolation positions of the X axis, the Y axis, and the Z axis is performed on the basis of interpolation positions on the B axis and the C axis, when the tool posture is near the peculiar posture, movement amounts of the X axis, the Y axis, and the Z axis increase according to an increase in a movement amount of the C axis. Therefore, influences of a backlash, a lost motion, and friction notably occur, and thus it is likely that machining accuracy is deteriorated.

Therefore, in this embodiment, suppression of a rotational movement amount of the C axis is to be attained by determining whether the tool posture commanded by the machining program is near the peculiar posture and, when the tool posture is near the peculiar posture, by performing control to limit a change in the tool posture.

Figure 2:
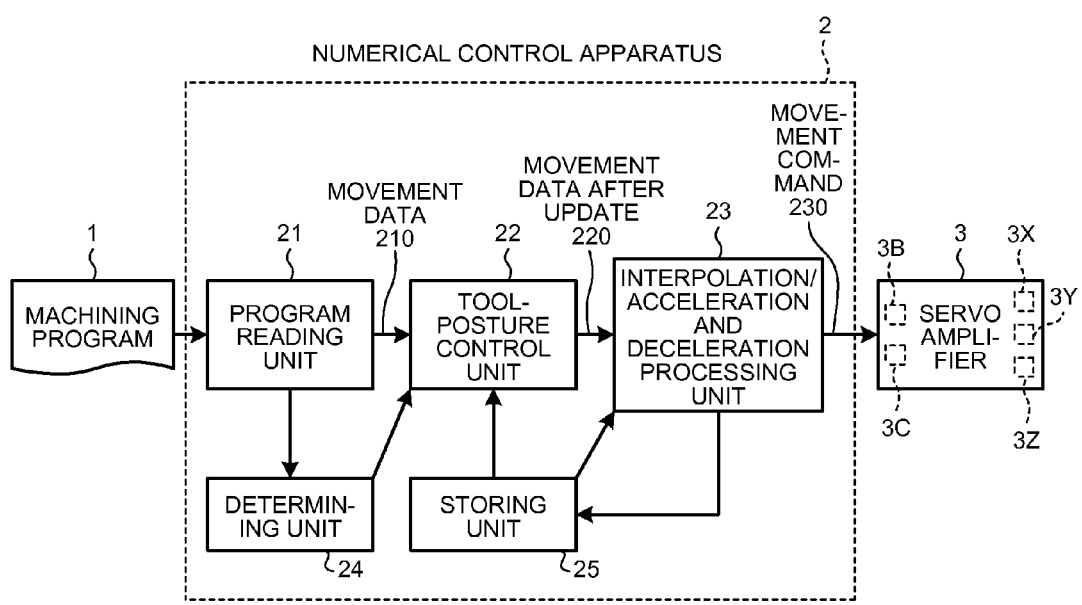
FIG. 2 is a diagram of the configuration of a numerical control apparatus according to the first embodiment.

Specifically, the numerical control apparatus 2 includes, as shown in FIG. 2, a program reading unit 21, a determining unit 24, a tool-posture control unit 22, an interpolation/acceleration and deceleration processing unit 23, and a storing unit 25.

The program reading unit 21 reads the machining program 1, analyzes an operation command described in the thus read machining program 1, generates movement data 210 for each of command blocks, and supplies the movement data 210 to the tool-posture control unit 22.

The movement data 210 is information concerning an operation such as moving positions (a block start point position and an end point position), a tool posture, a moving distance, moving speed, a commanded coordinate (a command in a table coordinate system and a command in a work coordinate system), interpolation modes (liner, arc, non-interpolation, etc.), and control modes (distinction of enabling and disabling of tool tip point control) of each of blocks obtained as a result of analyzing commands of the blocks. Note that the table coordinate system is a coordinate associated with table rotation in a machine including a rotation axis (in the case of FIG. 1, the C axis) for rotating the table. The work coordinate system command represents a coordinate system unrelated to the rotation of the table and is a coordinate system fixed on a space. In the tool tip point control, a tool track is commanded in either one of the coordinate systems according to the configuration of a machine and characteristics of a machining shape.

That is, the program reading unit 21 sequentially reads, for each of the blocks, a tool posture with respect to the work WK (e.g., a value of a vector representing the tool posture) from the machining program 1. The program reading unit 21 supplies the read tool posture to the determining unit 24.

The determining unit 24 determines whether the read tool posture is within a predetermined tool posture range. The predetermined tool posture range is a range including the peculiar posture. The peculiar posture is a posture of the tool 102 in which the principal plane 101a of the table 101 and the center axis CA of the tool 102 are set to cross substantially perpendicularly to each other by rotating the tool 102 about the B axis (see FIG. 1) and is a posture of the tool 102 at, for example, the B-axis angle of 0 degree. The predetermined tool posture range is, for example, a range that includes the peculiar posture (e.g., the B-axis angle of 0 degree) as a median and can be regarded as the vicinity of the peculiar posture (e.g., the B-axis angle of −1 degree to the B-axis angle of +1 degree). The determining unit 24 supplies a determination result to the tool-posture control unit 22.

The tool-posture control unit 22 receives the movement data 210 from the program reading unit 21 and receives a determination result from the determining unit 24. The tool-posture control unit 22 determines control content for the tool posture using the movement data 210 according to the determination result of the determining unit 24.

That is, when the read tool posture is within the predetermined tool posture range (i.e., the tool posture is near the peculiar posture), the tool-posture control unit 22 acquires data concerning the last tool posture (e.g., a value of a vector indicating the tool position) referring to the storing unit 25. The tool-posture control unit 22 determines target positions of the axes including a rotation axis angle of the C axis such that a change of the tool posture from the last tool posture is limited.

For example, when the read tool posture is within the predetermined tool posture range, the tool-posture control unit 22 determines target positions of the axes including a rotation axis angle of the C axis such that the last tool posture is retained.

The interpolation/acceleration and deceleration processing unit 23 receives data concerning the last tool posture (e.g., a result of the last interpolation/acceleration and deceleration processing) from the storing unit 25 and receives data concerning the present tool posture (i.e., movement data 220 after update) from the tool-posture control unit 22 as control content of the tool posture. The interpolation/acceleration and deceleration processing unit 23 controls the axes (the X axis, the Y axis, the Z axis, the B axis, and the C axis) according to the control content of the tool posture. The interpolation/acceleration and deceleration processing unit 23 controls a posture change from the present tool posture to the tool posture determined by the tool-posture control unit 22.

That is, the interpolation/acceleration and deceleration processing unit 23 performs interpolation/acceleration and deceleration processing according to the data concerning the last tool posture and the data concerning the present tool posture, generates the movement command 230 for the axes (the X axis, the Y axis, the Z axis, the B axis, and the C axis), and outputs the movement command 230 to the servo amplifier 3. The interpolation/acceleration and deceleration processing unit 23 supplies the data concerning the present tool posture (e.g., a value of a vector indicating the tool posture and a result of the interpolation/acceleration and deceleration processing) to the storing unit 25.

Note that a method of the interpolation/acceleration and deceleration processing is not particularly limited but can be, for example, a method of performing interpolation using the publicly-known technology disclosed in Patent Literature 1. For example, control for correcting interpolation positions of the X axis, the Y axis, and the Z axis on the basis of interpolation positions of the B axis and the C axis can be performed.

The storing unit 25 receives the data concerning the present tool posture from the interpolation/acceleration and deceleration processing unit 23 and stores the data. Consequently, the storing unit 25 stores the tool posture controlled by the interpolation/acceleration and deceleration processing unit 23.

Figure 3:
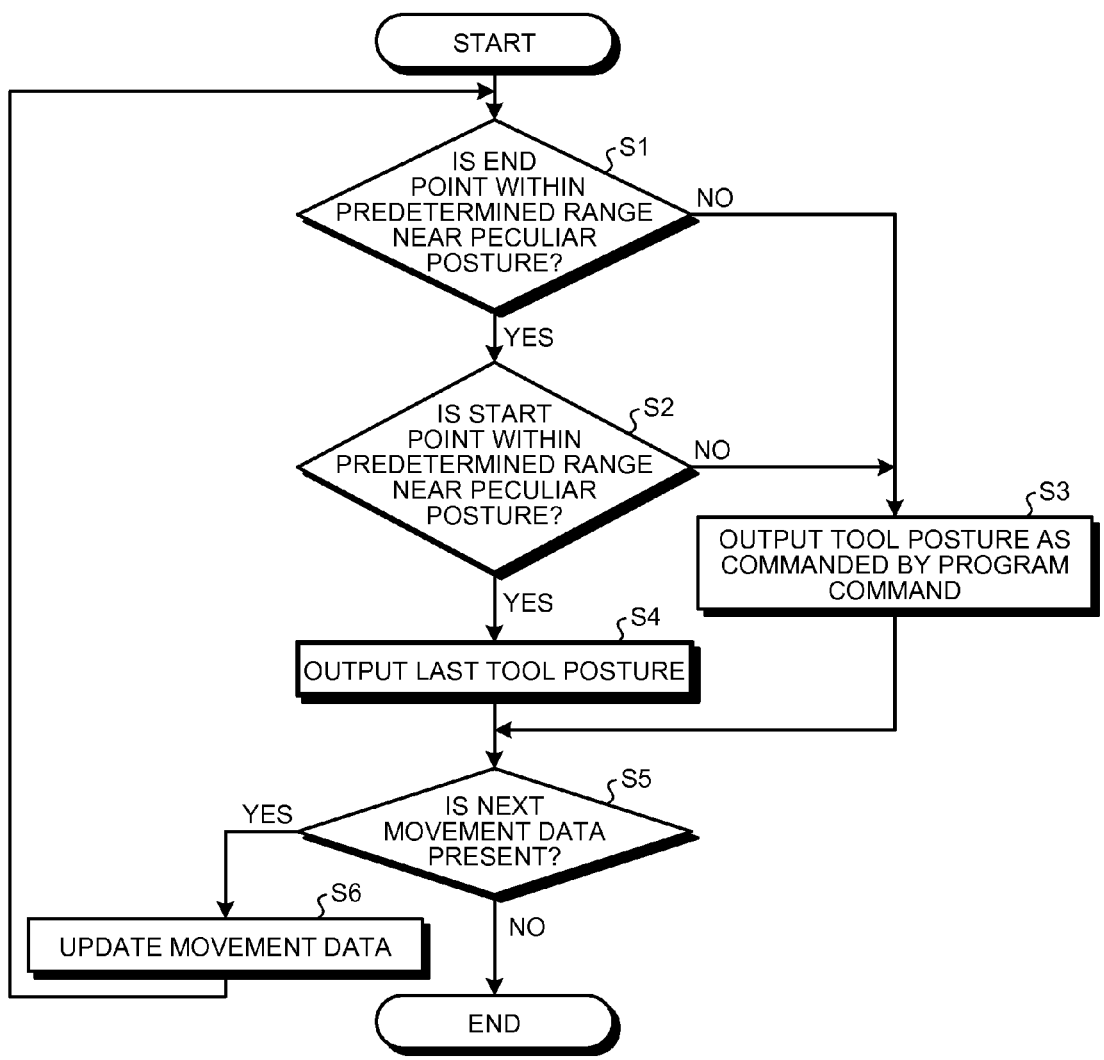
FIG. 3 is a flowchart for explaining the operation of the numerical control apparatus according to the first embodiment.

The operation of the numerical control apparatus 2 is explained with reference to FIG. 3. FIG. 3 is a flowchart for explaining the operation of the numerical control apparatus 2.

At step S1, the program reading unit 21 reads the machining program 1, analyzes an operation command described in the read machining program 1, generates the movement data 210 for each of command blocks, and supplies the movement data 210 to the tool-posture control unit 22.

The program reading unit 21 sequentially reads a tool posture (e.g., a value of a vector indicating the tool posture) with respect to the work WK from the machining program 1 for each of the blocks. The program reading unit 21 supplies the read tool posture to the determining unit 24.

The determining unit 24 determines whether the tool posture commanded by the machining program 1 (a tool posture at an end point of the read block) is within a predetermined tool posture range near the peculiar posture. When the tool posture at the end point of the block is within the predetermined tool posture range near the peculiar posture ("Yes" at step S1), the determining unit 24 advances the processing to step S2. When the tool posture at the end point of the block is outside the predetermined tool posture range ("No" at step S1), the determining unit 24 advances the processing to step S3.

The predetermined tool posture range near the peculiar posture is a range determined in advance to regard that a posture is near a peculiar point. For example, a range near the peculiar posture is 1 degree with respect to the peculiar posture (the B-axis angle of 0 degree), a range of the B-axis angle equal to or larger than −1 degree and equal to or smaller than +1 degree is regarded as being the vicinity of the peculiar posture.

At step S2, the determining unit 24 determines whether a tool posture at a start point of the read block is within the predetermined tool posture range near the peculiar posture. When the tool posture at the start point of the block is within the predetermined tool posture range near the peculiar posture ("Yes" at step S2), the determining unit 24 advances the processing to step S4. When the tool posture at the start point of the block is outside the tool posture range ("No" at step S2), the determining unit 24 advances the processing to step S3.

At step S3, the tool-posture control unit 22 outputs, as control content of the tool posture, data indicating the tool posture commanded by the machining program 1.

At step S4, the tool-posture control unit 22 outputs, as the control content of the tool posture, data indicating a tool posture different from the tool posture commanded by the machining program 1. For example, the tool-posture control unit 22 acquires data concerning the last tool posture referring to the storing unit 25, and then, the tool-posture control unit 22 determines a rotation axis angle of the B axis and/or the C axis so as to make the angle of either one or both of the B axis and the C axis of the machine for realizing a tool posture coincide with that of the last tool posture, and outputs, as the control content of the tool posture), data indicating a tool posture corresponding to a determination result.

Note that, at step S4, when a commanded coordinate in the movement data 210 is a work coordinate system command, the tool-posture control unit 22 performs processing explained below. First, the tool-posture control unit 22 coordinate-converts a tool tip position (a work coordinate value) commanded by the machining program 1 into a table coordinate value using a rotation axis angle commanded by the machining program 1. Subsequently, the tool-posture control unit 22 performs a change of the tool posture (the rotation axis angle) according to the method explained above. Further, the tool-posture control unit 22 performs processing for coordinate-converting the table coordinate value into movement positions of the axes using the rotation axis angle after the change to calculate a block end point position and setting the block end point position as an end point coordinate value of the movement data 210.

At step S5, the tool-posture control unit 22 checks whether the next movement data is present. When the next movement data is present ("Yes" at step S5), the tool-posture control unit 22 updates the movement data (step S6) and shifts the processing to step S1. Note that, when the next movement data is absent ("No" at step S5), the tool-posture control unit 22 ends the processing.

As explained above, in the first embodiment, in the numerical control apparatus 2, the determining unit 24 determines whether the tool posture read by the program reading unit 21 is within the predetermined tool posture range including the peculiar posture. When the tool posture is within the predetermined tool posture range including the peculiar posture, the tool-posture control unit 22 determines the rotation axis angles of the rotation axes (the B axis and the C axis) such that a change of the tool posture from the last tool posture is restricted. Consequently, when the tool posture commanded by the machining program is near the peculiar posture, it is possible to suppress rotational movement amounts of the rotation axes (the B axes and the C axes) and reduce the time for rotational movement of the rotation axes (the B axis and the C axis). Even if control for correcting interpolation positions of the X axis, the Y axis, and the Z axis is performed on the basis of interpolation positions of the B axis and the C axis, when the tool posture is near the peculiar posture, it is possible to suppress the rotational movement amounts of the rotation axes (the B axis and the C axis). Therefore, it is possible to suppress movement amounts of the X axis, the Y axis, and the Z axis as well, reduce the influences of a backlash, a lost motion, and friction, and improve machining accuracy. That is, it is possible to reduce the time of the rotational movement of the rotation axes and improve machining accuracy.

In the first embodiment, in the numerical control apparatus 2, the storing unit 25 stores the tool posture controlled by the interpolation/acceleration and deceleration processing unit 23. Consequently, the tool-posture control unit 22 can grasp the last tool posture referring to the storing unit 25. When the tool posture is within the predetermined tool posture range including the peculiar posture, the tool-posture control unit 22 can determine rotation axis angles of the rotation axes (the B axis and the C axis) such that a change of the tool posture from the last tool posture is restricted.

In the first embodiment, in the numerical control apparatus 2, when the read tool posture is within the predetermined tool posture range, the tool-posture control unit 22 determines rotation axis angles of the rotation axes (the B axis and the C axis) such that the last tool posture is retained. Consequently, the tool-posture control unit 22 can determine rotation axis angles of the rotation axes (the B axis and the C axis) such that a change of the tool posture from the last tool posture is limited.

For example, when the read tool posture is within the predetermined tool posture range, the tool-posture control unit 22 performs processing for matching the rotation axis angle of at least one of the B axis and the C axis, which are the two rotation axes, to the last rotation axis angle. Consequently, it is possible to eliminate useless axis movement. By eliminating useless axis movement, it is possible to prevent occurrence of a backlash and a lost motion that occur when moving directions of the axes are reversed.

For example, when the tool posture fluctuates near the peculiar posture, the tool posture can be changed to set, among rotation axis angles for realizing the tool posture designated by the machining program, only an angle of the B axis to a calculated angle and retain an angle of the C axis at a value same as a value of the last time (a tool posture at the time when the tool posture enters the predetermined range near the peculiar posture). Consequently, there is an effect that it is possible to move a B-axis operation as commanded and change, at higher speed, the tool posture to a tool posture nearer to the commanded tool posture.

In the first embodiment, for example, when both of a start point and an end point of the read block is within the predetermined tool posture range, the determining unit 24 determines that the read tool posture is within the predetermined tool posture range. When at least one of the start point and the end point of the read block is outside the tool posture range, the determining unit 24 determines that the read tool posture is not within the predetermined tool posture range. Consequently, it is possible to surely determine whether or not the read tool posture is within the predetermined tool posture range.

Second Embodiment

The numerical control apparatus 2 according to a second embodiment is explained. In the following explanation, differences from the first embodiment are mainly explained.

In the first embodiment, when the tool posture commanded in the machining program fluctuates near the peculiar posture, for example, the control for retaining the last tool posture is performed. However, in the second embodiment, control for gradually performing a posture change near the peculiar posture is performed.

Figure 4:
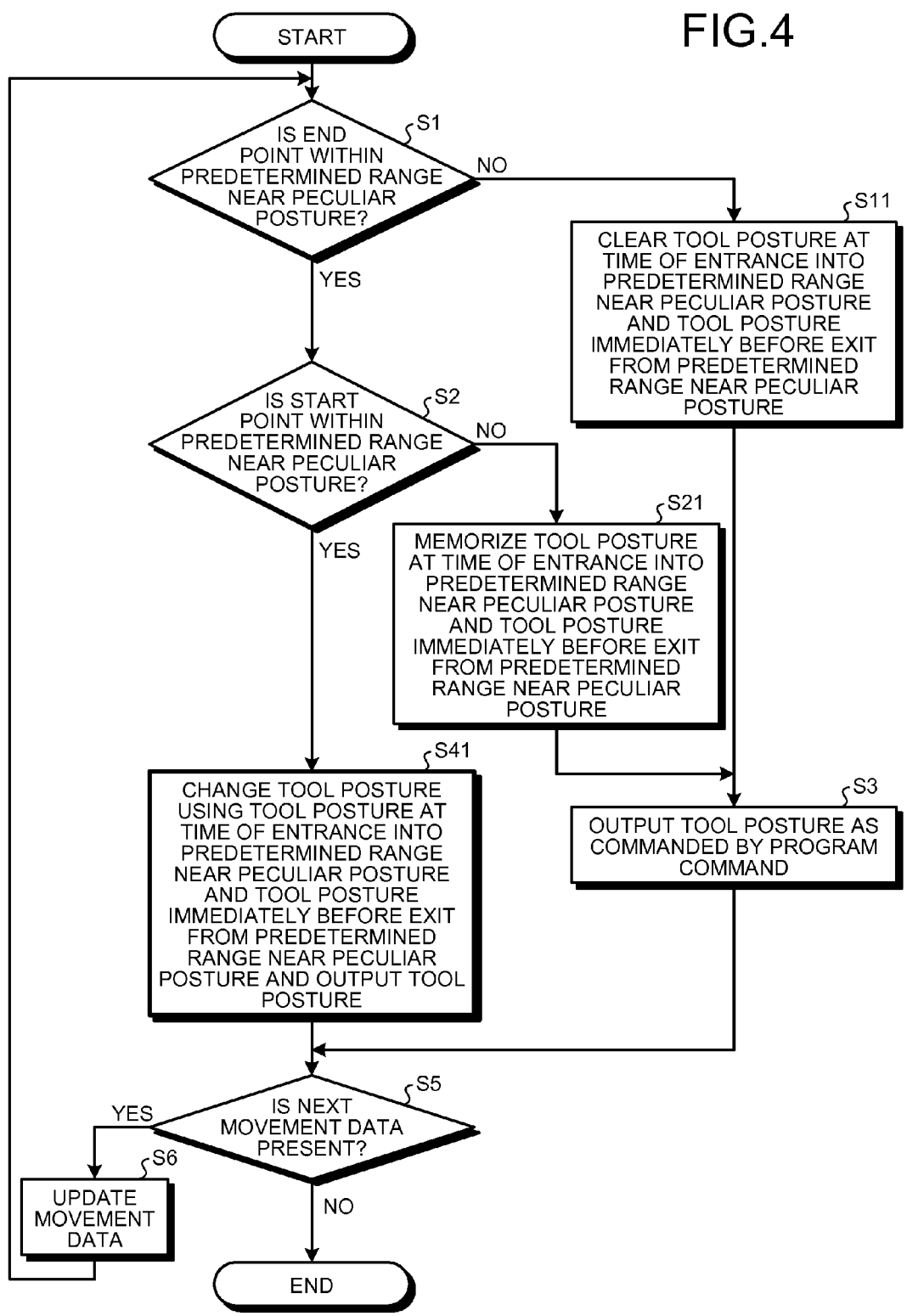
FIG. 4 is a flowchart for explaining the operation of a numerical control apparatus according to a second embodiment.

Specifically, as shown in FIG. 4, the numerical control apparatus 2 performs an operation different from the operation in the first embodiment as explained below. FIG. 4 is a flowchart for explaining the operation of a numerical control apparatus according to the second embodiment. Note that explanation of steps S3, S5, and S6 is omitted because the steps are the same as the steps in the first embodiment.

At step S1, when the tool posture at the end point of the block is outside the predetermined tool posture range ("No" at step S1), the determining unit 24 advances the processing to step S11.

At step S2, when the tool posture at the start point of the block is within the predetermined tool posture range near the peculiar posture ("Yes" at step S2), the determining unit 24 advances the processing to step S41. When the tool posture at the start point of the block is outside the predetermined tool posture range ("No" at step S2), the determining unit 24 advances the processing to step S21.

Step S11 is processing performed when the end point of the read block is outside the predetermined tool posture range near the peculiar posture. In this case, a change of the tool posture is not carried out. Therefore, processing for clearing (erasing) information stored at the last step S21 from the storing unit 25 is performed.

At step S21, extraction of a range in which the tool posture is changed from its entrance into the predetermined tool posture range near the peculiar posture until its exit therefrom is performed. That is, the tool-posture control unit 22 causes the storing unit 25 to store (memorize) a tool posture at the time of entrance into the predetermined tool posture range and causes the storing unit 25 to store (memorize) a tool posture immediately before exit from the predetermined tool posture range to the outside of the predetermined tool posture range.

Specifically, step S21 is a step carried out when the tool posture at the start point of the read machining program is outside the range of the peculiar posture and the tool posture at the end point is within the range of the peculiar posture. Further a tool posture VS at the end point described in the machining program is stored in advance, look-ahead operation of the machining program is performed, and acquisition and storage of a tool posture VE immediately before the exit from the predetermined range near the peculiar posture are performed.

Step S41 is the same as step S4 in the first embodiment in that a tool posture different from the tool posture described in the machining program is output. However, processing different from step S4 in the first embodiment is performed concerning a method of changing the tool posture.

Specifically, at step S41, processing for changing the tool posture is performed using the tool postures VS and VE stored at step S21. As explained below, processing for changing rotation axis angles of at least one or more axes to gradually increase or gradually decrease is performed.

For example, it is assumed that a machining program created by the CAM is as shown below.

| N21 | G43.5 | X0. | Y0. | I0.7071 | J0.0000 | K0.7071; |
|---|---|---|---|---|---|---|
| N22 | | X10. | Y0. | I0.003491 | J0.000000 | K0.999994; |
| N23 | | X0 | Y10. | I0.003491 | J0.006046 | K0.999976; |
| N24 | | X1. | Y11. | I0.000000 | J0.000000 | K1.000000; |
| N25 | | X6. | Y10. | I0.003438 | J0.000606 | K0.999994; |
| N26 | | X15. | Y11. | I0.000364 | J0.002063 | K0.999998; |
| N27 | | X15. | Y30. | I0.353553 | J0.353553 | K0.866025; |
| ... | | | | | | |
| N30 | G49; | | | | | |

This machining program shows a case in which a B-axis angle fluctuates in a predetermined range near the peculiar posture. In blocks "N22" to "N26", tool postures are near the peculiar posture.

If the rotation axes are moved as indicated by the machining program and selection of a solution is performed to reduce movement amounts of rotation axis angles, the rotation axis angles are set to angles shown in a table of FIG. 5(a). In the blocks "N22" to "N26", a C-axis angle largely increases and decreases between 0 degree and 80 degrees. That is, the machining program is a program for repeating the large increase and decrease. Note that, in this case, the tool posture VS calculated at step S21 is a tool posture at an "N22" block end point. The tool posture VE is a tool posture at an "N26" block end point.

On the other hand, in the second embodiment, a section between the start point and the end point of the range near the peculiar posture is divided at, for example, equal intervals such that the rotational movement of the rotation axis is gradually performed. That is, at least one or more rotation axes are gradually reduced or gradually increased from the tool posture VS at the time of the entrance into the predetermined tool posture range near the peculiar posture to the tool posture VE immediately before the exit from the predetermined tool posture range near the peculiar posture.

For example, when only a C-axis angle is changed, the C-axis angle is changed as shown in a table of FIG. 5(b). In the table of FIG. 5(b), the C-axis angle gradually increases from 0 degree to 80 degrees in the "N22" to "N26" blocks. For example, the C-axis angle gradually increases by a unit amount of each equal interval of 20 degrees in the "N22" to "N26" blocks.

Alternatively, for example, when not only the C axis angle is gradually increased but also the B axis angle is gradually reduced, the C-axis angle and the B-axis angle are changed as shown in a table of FIG. 5(c). In the table of FIG. 5(c), the C-axis angle gradually increases from 0 degree to 80 degrees and the B-axis angle gradually decreases from 0.20 degree to 0.12 degree in the "N22" to "N26" blocks. For example, the C-axis angle gradually increases by a unit amount of each equal interval of 20 degrees and the B-axis angle gradually decreases by a unit amount of each equal interval of 0.02 degree.

In this way, in the second embodiment, the tool-posture control unit 22 changes the rotation axis angles of the rotation axes (the B axis and the C axis) to gradually increase or gradually reduce the rotation axis angles of the rotation axes (the B axis and the C axis) from the tool posture at the time of the entrance into the predetermined tool posture range to the tool posture immediately before the exit from the predetermined tool posture range. Consequently, when the tool posture is near the peculiar posture, it is possible to suppress the rotational movement amount of the rotation axes (the B axis and the C axis) and smoothly change the tool posture.

In the second embodiment, the tool-posture control unit 22 changes the rotation axis angles of the rotation axes (the B axis and the C axis) to gradually increase or gradually reduce the rotation axis angles of the rotation axes (the B axis and the C axis) by a unit amount of an equal interval concerning each of a plurality of blocks from the tool posture at the time of the entrance into the predetermined tool posture range to the tool posture immediately before the exit from the predetermined tool posture range. Consequently, it is easy to smoothly change the tool posture among the blocks.

Note that, in the second embodiment, the B-axis angle and the C-axis angle of the movement command in the predetermined tool posture range near the peculiar posture are gradually reduced and gradually increased such that the B-axis angle and the C-axis angle change at equal intervals concerning each of a plurality of blocks. However, intervals can be varied in association with a linear movement amount of a tool tip position viewed from work, that is, linear movement amounts of the X axis, the Y axis, and the Z axis. That is, the tool-posture control unit 22 can change, according to moving distances of the linear axes, a unit amount by which the rotation axes angles should be gradually increased or gradually reduced.

For example, in the case shown in FIG. 1, because the rotation of the C axis is along an X-Y plane, a unit amount by which the rotational movement amount of the C axis should be gradually increased or gradually reduced can be controlled to decrease as the linear movement amount of the X axis and the linear movement amount of the Y axis increase. Because the rotation of the B axis is along an X-Z plane, a unit amount by which the rotational movement amount of the B axis should be gradually increased or gradually reduced can be controlled to decrease as the linear movement amount of the X axis and the linear movement amount of the Z axis increase.

In this way, when the tool-posture control unit 22 changes, according to the moving distances of the linear axes, the unit amount by which the rotation axis angles should be gradually increased or gradually reduced, it is possible to associate the movement amounts of the linear axes in the predetermined tool posture range near the peculiar posture with the change of the tool posture. Therefore, there is an effect that it is possible to obtain a smoother machined surface.

INDUSTRIAL APPLICABILITY

As explained above, the numerical control apparatus according to the present invention is useful for control of a machine tool.

REFERENCE SIGNS LIST

1 Machining program
2 Numerical control apparatus
3 Servo amplifier
3X X-axis amplifier
3Y Y-axis amplifier
3Z Z-axis amplifier
3B B-axis amplifier
3C C-axis amplifier
21 Program reading unit
22 Tool-posture control unit
23 Interpolation/acceleration and deceleration processing unit
24 Determining unit
25 Storing unit
100 Machine tool
101 Table
102 tool
103X X-axis servomotor
103Y Y-axis servomotor
103Z Z-axis servomotor
103B B-axis servomotor
103C C-axis servomotor
210 Movement data
220 Movement data after update
230 Movement command

The invention claimed is:

1. A numerical control apparatus that controls a machine tool including a plurality of linear axes and a first rotation axis and a second rotation axis and controls a relative tool posture of a tool with respect to work placed on a table, the numerical control apparatus comprising:
 a program reading unit that sequentially reads, from a machining program including a plurality of blocks described by a command code to the machine tool, for each of the blocks, a tool posture of the tool with respect to the work;
 a determining unit that determines whether or not the read tool posture is within a predetermined tool posture range;
 a tool-posture control unit that determines control content of the tool posture according to a result of the determination by the determining unit; and
 an interpolation/acceleration and deceleration processing unit that controls the plurality of linear axes and the two or more rotation axes according to the determined control content of the tool posture, wherein:
  the predetermined tool posture range includes a peculiar posture in which a principal plane of the table and a center axis of a tool cross perpendicularly to each other, and which corresponds to an angle of the first rotation axis,
  when, for each of the read blocks, an angle of the first rotation axis at a start point of the read block is within the predetermined tool posture range and an angle of the first rotation axis at an end point of the read block is within the predetermined tool posture range, the determining unit determines that the read tool posture is within the predetermined tool posture range, and
  when the read tool posture is within the predetermined tool posture range, the tool-posture control unit determines a rotation axis angle of the second rotation axis such that a change of an angle of the second rotation axis from a last angle of the second rotation axis is limited to a certain value and when the read tool posture is outside of the predetermined tool posture range, the tool-posture control unit determines the rotation axis angle of the second rotation axis such that the change of the angle of the second rotation axis angle is permitted to exceed the certain value.

2. The numerical control apparatus according to claim 1, further comprising a storing unit that stores the tool posture controlled by the interpolation/acceleration and deceleration processing unit.

3. The numerical control apparatus according to claim 1, wherein, when the read tool posture is within the predetermined tool posture range, the tool-posture control unit determines a rotation axis angle of the second rotation axis such that the last angle of the second rotation axis is retained.

4. The numerical control apparatus according to claim 1, wherein the tool-posture control unit changes a rotation axis angle of the second rotation axis to gradually increase or gradually reduce the rotation axis angle of the second rotation axis from a tool posture at the time of an entrance of the tool into the predetermined tool posture range to a tool posture immediately before an exit of the tool from the predetermined tool posture range.

5. The numerical control apparatus according to claim 4, wherein the tool-posture control unit changes, according to moving distances of the linear axes, a unit amount by which the rotation axis angles should be gradually increased or gradually reduced.

6. The numerical control apparatus according to claim 1, wherein, when the read tool posture is within the predetermined tool posture range, the tool-posture control unit determines a rotation axis angle of the first rotation axis such that a change of an angle of the first rotation axis from a last angle of the first rotation axis is not limited.

7. The numerical control apparatus according to claim 1, wherein
- the peculiar posture is a posture where the angle of the first rotation axis is 0 degrees, the principal plane of the table and the center axis of the tool crossing perpendicularly to each other at the angle, and
- the predetermined tool posture range is a range of predetermined angles with respect to the angle of the first rotation axis at the peculiar posture.

\* \* \* \* \*